L. ROSENFELD.
DISPENSING OR MEASURING DEVICE.
APPLICATION FILED SEPT. 9, 1919.

1,332,998.

Patented Mar. 9, 1920.
2 SHEETS—SHEET 2.

Louis Rosenfeld, Inventor
Attorney

UNITED STATES PATENT OFFICE.

LOUIS ROSENFELD, OF BALTIMORE, MARYLAND.

DISPENSING OR MEASURING DEVICE.

1,332,998.   Specification of Letters Patent.   Patented Mar. 9, 1920.

Application filed September 9, 1919. Serial No. 322,659.

*To all whom it may concern:*

Be it known that I, LOUIS ROSENFELD, a citizen of the United States of America, residing at Baltimore, in the State of Maryland, have invented certain new and useful Improvements in Dispensing or Measuring Devices, of which the following is a specification.

This invention relates to dispensing or measuring devices, and particularly to means for measuring a socalled "mix" for icecream-making and delivering it from a mixing vat to the freezer can.

An object of this invention is to provide novel means whereby cream and its flavoring ingredients may be drawn from a vat and measured and thereafter delivered to a freezing can, the said invention also including means for operating the valves thereof in unison so that the valve for controlling the pipe or conduit from the vat to the measuring receptacle will be closed simultaneously with the opening of the said valve which controls the discharge pipe of the measuring device.

A still further object of this invention is to produce a measuring device of the character indicated which can be readily washed interiorly and the parts of which can be removed for displacing deposits which may collect in the strainer suspended within the measuring receptacle.

A still further object of this invention is to produce a measuring device having an automatically closing vent which will admit air during the filling operation, but which will close and prevent the escape of fluid and which will uncheck and admit air when contents of the measuring receptacle is to be drawn off.

With the foregoing and other objects in view, the invention consists in the details of construction and in the arrangement and combination of parts to be hereinafter more fully set forth and claimed.

In describing the invention in detail, reference will be had to the accompanying drawings forming part of this specification wherein like characters denote corresponding parts in the several views, and in which—

Figure 1:
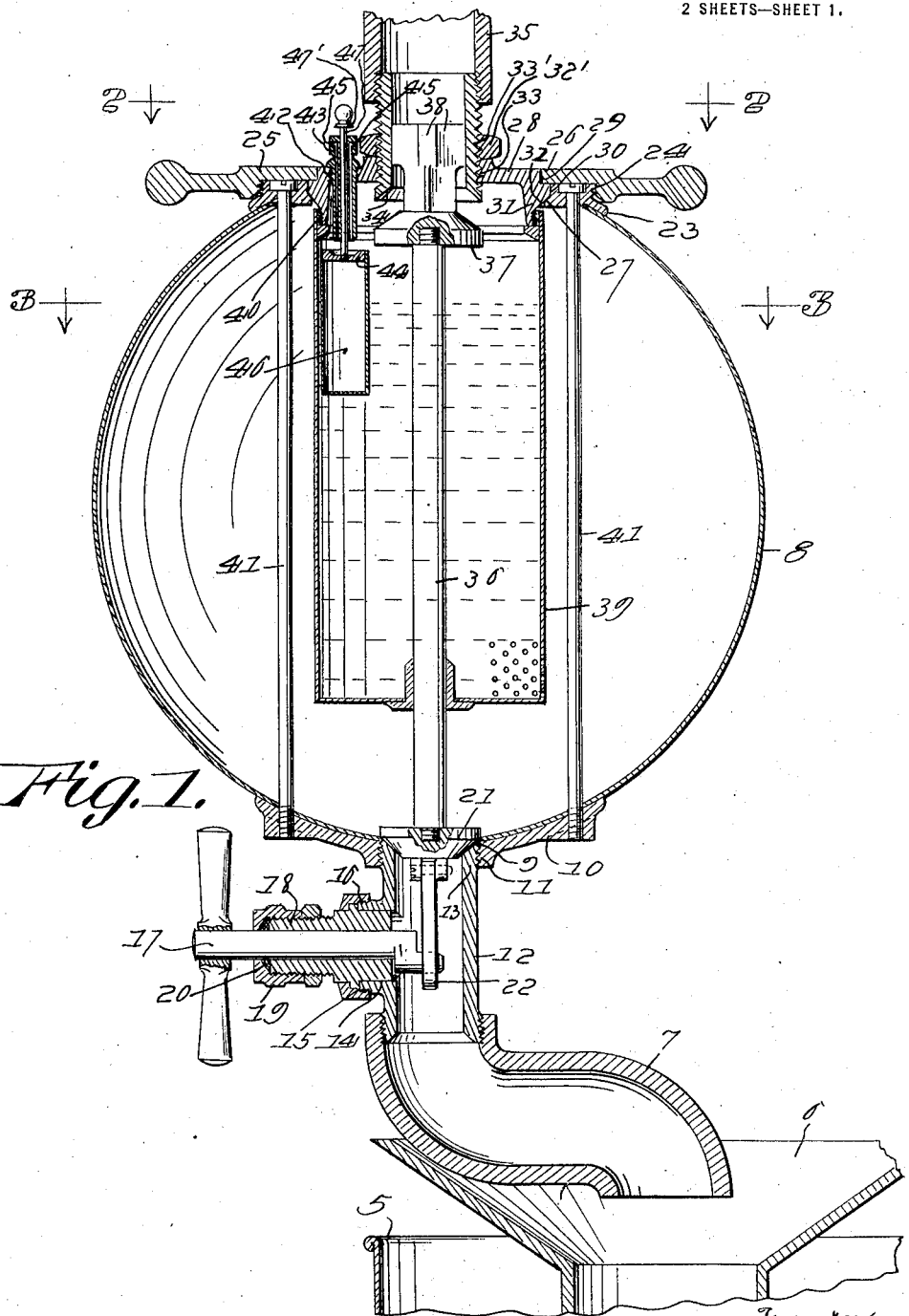
Figure 1 illustrates a sectional view of a measuring device showing a fragment of a connection for a vat and means for delivering fluid to a can.
Figure 2:
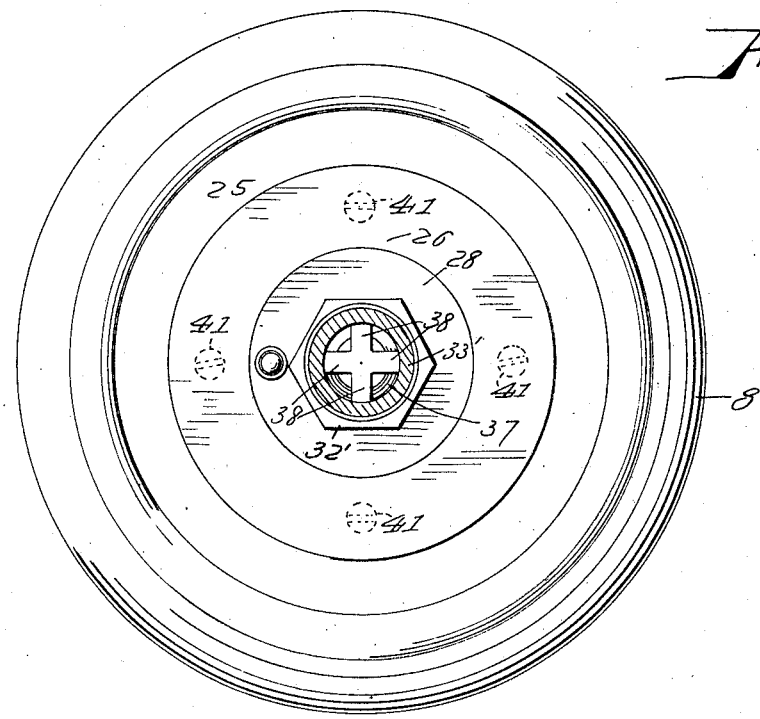
Fig. 2 illustrates sectional view corresponding to the line 2—2 of Fig. 1.
Figure 3:
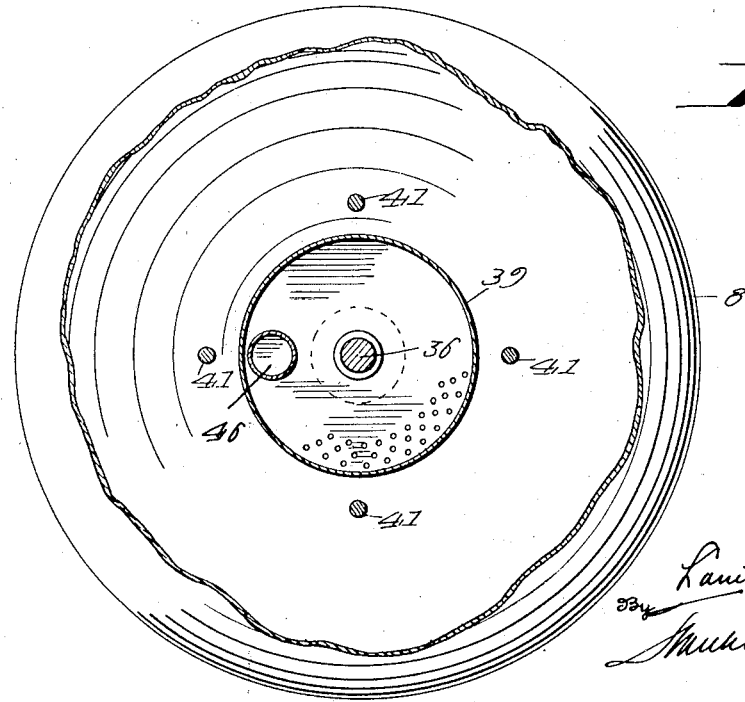
Fig. 3 illustrates a sectional view of the device on a line corresponding with the line 3—3 of Fig. 1.

In these drawings 5 denotes a can or receptacle to which the mix is to be delivered for freezing, but this element is only conventionally illustrated since it may comprise a can or receptacle of any appropriate type. The funnel 6 is also conventionally shown and in fact it may be dispensed with and the discharge pipe 7 may deliver direct to the can. These parts, however, do not form a part of the present invention, and further detailed description is believed unnecessary.

The receptacle or measuring chamber 8 may be of any desired configuration, but is here shown as substantially round. It has an opening 9 at the bottom and the outer surface is supplied with a face or reinforcing plate 10 with a threaded aperture 11 alining with the aperture 9 of the receptacle 8. A valve fitting is threaded in the aperture of the plate and comprises a pipe 12 having a valve seat 13 at its upper end and an apertured side wall 14 with a flange 15 which is internally threaded as shown at 16. A valve operating crank 17 is rotatably mounted in the member 18 which is secured in the aperture of the pipe by means of the ring nut 19. The member 18 is also supplied with a packing ring 20 which renders the joint between the crank and the said member 18 leak-proof.

The valve 21 coacts with the valve seat 13 and a link 22 is pivotally connected to the said valve and its lower end is connected to the crank 17 so that as the crank is rotated motion is communicated to the valve 21 for opening and closing it.

The receptacle 8 has a flange ring 23 secured on its top and the said ring has threads 24 to engage the clamping ring 25, and the said clamping ring has a flange 26 for a purpose to be presently explained.

The flange ring 23 has a beveled shoulder 27 on its inner side and it forms a seat for a closure 28, the said closure comprising an apertured plate having its edge provided with stepped shoulders 29 and 30, a depending flange 31 which is externally threaded and an intermediate beveled bearing surface 32 which rests on the beveled surface 27 of the ring 23.

The closure 28 has the wall of its aperture provided with threads 32 in which a nipple 33 is threaded, the inner end of the said nipple being beveled to form a valve seat 34 and the outer end of said nipple constitutes a connection for a pipe 35 which may lead from the vat or source of fluid supply.

A valve steam or connection 36 is threaded in the valve 21 and in a valve 37, the latter of which coacts or engages the valve seat 34 when the valve 21 is unseated. The valve 21 is guided in the nipple 33 by the lugs or wings 38 which are formed on the upper end or extension of the said valve. The valves are therefore operated in unison, one closing when the other opens, and vice versa.

The strainer 39 has a threaded upper end as shown at 40, which engages the threads of the depending flange of the closure, and by reason of the construction of the parts the strainer may be removed for dislodging deposits or for other purposes.

The flange ring 23 and the plate 10 are held in assembled relation to the receptacle 8 by the screws 41 which are threaded in the plate 10 and extend through apertures in the flanged ring, and the receptacle cover 8 has a threaded aperture 42 for the reception of a casing 43 of the check valve 44, the said casing having ports 45 (for the admission or escape of air) which are automatically closed by the check valve 44 when the fluid has reached a predetermined height in the receptacle and this is accomplished by supplying the said valve with an air tight chamber 46, so that when the fluid rises in the receptacle it will lift the valve to close the said ports and as the fluid descends in the receptacle the weight of the valve and air tight chamber will serve to carry the valve away from its seat.

A valve stem 47 is connected to the valve and reciprocates in the valve casing, and the said valve stem has a shoulder 47' which contacts the upper end of the valve casing and limits the movement of the valve.

When it is desired to dismantle the device, the clamp 25 is removed to permit the removal of the cover which supports and carries the strainer and check valve, and thereafter access may be had to the valve 37 so that it can be removed to allow the strainer to free itself from the rod 36, after which access to the interior of the receptacle may be had, so that the strainer and other parts which have been removed may be treated for removing deposits or for other purposes.

The foregoing measuring device has been found to be efficient and satisfactory in use, as it enables the manufacturer of ice-cream to know the exact amount of the "mix" which is supplied to a freezing can and the step in the manufacture of ice-cream of transferring the fluid from a mixing vat to the freezing can, can be expeditiously carried out without liability of waste of the material.

I claim:

1. In a measuring device, a receptacle having an opening at the top and an opening at the bottom, a ring secured to the top of the receptacle around the opening, a beveled shoulder on the inner side of the said ring, a closure engaging the beveled surface of the ring, a depending annular flange on the said closure, a strainer supported by said flange, said strainer having a guide in its bottom, a valve stem slidable in the guide, valves connected to opposite ends of the valve stem and adapted to operate oppositely, a supply pipe extending through the closure of the top controlled by one of the valves, and a discharge pipe from the bottom of the receptacle controlled by the other of said valves.

2. In a measuring device, a receptacle having an opening at the top and an opening at the bottom, a ring secured to the top of the receptacle around the opening, a beveled shoulder on the inner side of the said ring, a closure engaging the beveled surface of the ring, a depending annular flange on the said closure, a strainer supported by said flange, said strainer having a guide in its bottom, a valve stem slidable in the guide, valves connected to opposite ends of the valve stem and adapted to operate oppositely, a supply pipe extending through the closure of the top controlled by one of the valves, a discharge pipe from the bottom of the receptacle controlled by the other of said valves, a reinforcing plate applied to the exterior of the receptacle at the bottom and having an aperture alining with the discharge opening, said plate having threaded apertures, the upper ring having apertures and bolts extending through the apertures of the ring and plate for holding the parts in assembled relation.

LOUIS ROSENFELD.